March 7, 1939. R. A. SANDBERG 2,150,008
BRAKE LEVER
Filed May 14, 1937
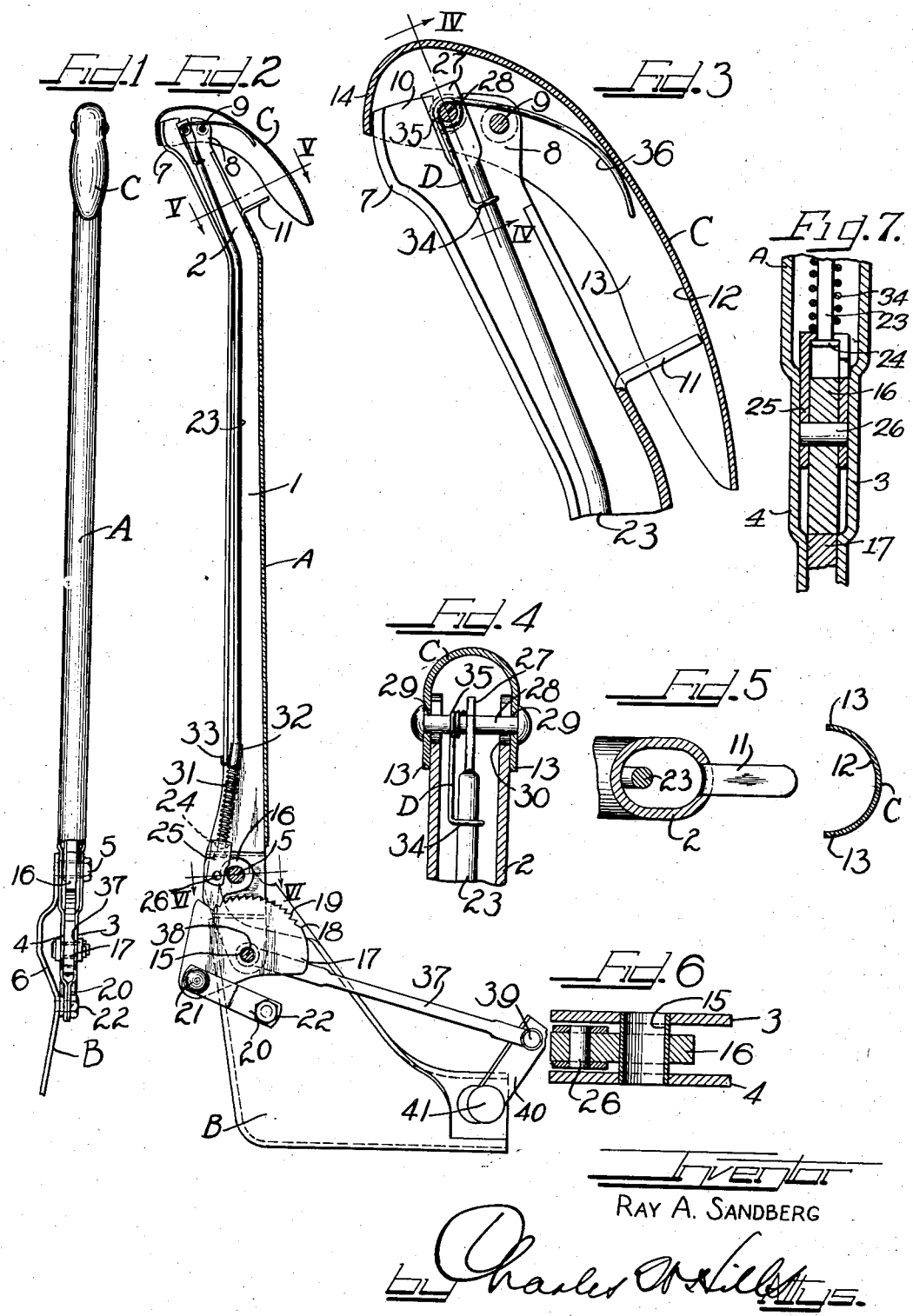
Inventor
RAY A. SANDBERG

UNITED STATES PATENT OFFICE 2,150,008

BRAKE LEVER

Ray A. Sandberg, Waukegan, Ill., assignor, by mesne assignments, to Houdaille-Hershey Corporation, Detroit, Mich., a corporation of Michigan Application May 14, 1937, Serial No. 142,569

4 Claims. (Cl. 74—537)

The invention relates to a brake lever and more particularly to a lever comprising a stamping forming hollow shank and grip portion, with the extremity of the grip portion open.

In the manufacture of levers as stampings, it is possible to fashion the same into substantially finished form by stamping operations, with the free end of the lever open. It is usual to cap such open end by a piece of metal spun or otherwise secured to the open end. This, however, increases the cost of manufacture of such levers.

As a safety measure, it is desirable that the operator's hands be protected from injury by reason of the fact that the free end of the lever is open.

The present invention has, for one of its objects, the provision of novel closure means for the ends of stamped levers which are fashioned in completed condition without caps over such open ends.

Another object of the present invention is to provide a clutch actuating member with parts which overlie and encompass the open end of a brake lever for protecting the hand of the operator from injury incidental to operation of such member.

A further object of the present invention is to provide a novel spring mounting for the spring which normally maintains the cooperating clutching elements of a lever clutch in latched position.

A still further object of the present invention is to provide novel means for connecting the pawl and pawl actuating means of a brake lever.

The above, other, and further objects of the present invention will be apparent from the following description and accompanying drawing.

The accompanying drawing illustrates a hand brake lever constructed in accordance with the principles of the present invention wherein the lever is illustrated as one of the regular or floor type, as opposed to the dash type, for use with automotive vehicles, and the views thereof are as follows:

Figure 1 is an edge elevational view of an automotive emergency brake lever, constructed in accordance with the principles of the present invention.

Figure 2 is a view partially in elevation and partially in longitudinal section, of the lever of Figure 1, showing the parts with the lever in "off" position.

Figure 3 is an enlarged fragmental longitudinal sectional view of the upper end of the lever illustrated in Figure 2 showing the actuating member moved against its stop, with the parts at the free end of the lever disposed as result of grip pressure applied to the actuating member.

Figure 4 is a fragmental enlarged vertical sectional view taken substantially in the plane indicated by the line IV—IV of Figure 3.

Figure 5 is an enlarged fragmental transverse sectional view taken substantially in the plane indicated by the line V—V of Figure 2.

Figure 6 is a fragmental enlarged transverse sectional view, with the ratchet omitted, taken in the plane indicated by the line VI—VI of Figure 2.

Figure 7 is an enlarged fragmental vertical sectional view through the yoke and pawl, showing details of construction.

The drawing will now be explained.

The term "regular" type of brake lever is herein utilized to designate an automotive brake lever which is pivoted adjacent its lower end, usually to some part of the transmission or engine casing of the vehicle, with its shank extending upwardly through the floor and presenting its grip portion in convenient position for grasp by the operator. The term "dash" type brake lever is herein used to designate a lever which is pivoted adjacent its upper end, behind the instrument board of an automotive vehicle, with the free end of the lever below the pivot and projecting downwardly beyond the lower margin of the instrument board for grasp by the vehicle operator.

The present invention is applicable as well to the "dash" type of lever as it is to the "regular" type of lever herein illustrated.

The brake lever herein illustrated, and designated generally at "A", is fashioned by stamping or suitable operation to provide a hollow shank portion 1 and a hollow grip portion 2. While in the present instance the grip portion is shown as disposed with its axis in angular relation to the axis of the shank portion 1, nevertheless, the portion could be straight, if desired.

The lever A has at its lower end two parallel legs 3 and 4 which are pivoted, by means of a suitable pivot 5 to a support, such as a bracket, represented generally at B, fastened to the vehicle.

The legs 3 and 4 of the lever are integral with the balance of the lever and are fashioned by suitable stamping operations.

The free end of the lever, herein shown at the upper end, is, during the formation of it, processed to provide a bulge or flare 7 arranged above the finger portion of the grip, to constitute a stop for the fingers of the operator, and thus prevent the operator's hand from slipping off the free end of the lever when applying pressure to the lever to move it to set position.

The lever is illustrated as formed with ears 8 which are disposed opposite to the bulge or flare 7, through which passes a rivet 9 for pivotally connecting the actuating member, represented generally at C, to the lever.

Below the margin 10 defining the open extremity of the free end of the lever, and extending lengthwise of the grip portion of the lever on the palm side thereof, a tongue 11 is struck out of the material of the grip portion and bent to project outwardly from the grip portion, and constituting a stop.

The actuating member C is fashioned, by stamping or other suitable manufacturing means, from flat metal stock, to provide a member which is convexly curved in side elevation and substantially U-shaped in cross section, thus forming a web 12 and side walls 13 which are continuous along the length of the member and across one end, as at 14, and substantially merging into the web at the other end of the member C, as illustrated in Figure 3. The depth of the wall 13 is such that when the member C is pivoted to the lever, a portion of the web of the member will overlie the open end of the lever and portions of the side walls 13 will encompass the free end of the lever immediately below the margin 10 which defines the open end of the lever. The depth of the wall is sufficient to fully protect injury occurring to the hand of the vehicle operator, in manipulating the lever.

A pawl 16 is pivoted to rock on the lever pivot 5.

A floating sector, or ratchet plate, 17, is pivoted by a tubular pivot member 15, to the ends of the legs 3 and 4 of the lever, and has an arcuate edge 18 provided with teeth 19 constituting a ratchet, for cooperation with the pawl to latch or clutch the lever A in adjused position.

To cause swinging movement of the plate 17, as the lever is swung in service, the plate is connected by metallic straps 20 to the support or bracket B. The straps are connected to the plate 17 by a shouldered rivet 21 and to the bracket B by a bolt 22.

For unlatching the pawl from engagement with the ratchet, a pawl rod 23 is utilized.

At its end adjacent the pawl the rod is provided with a head 24.

The rod 23 is shown as connected to the pawl 16 by means of a yoke 25 with its web portion apertured to receive the rod and its legs pivoted at 26 to the pawl 16.

At the end of the rod remote from its connection to the pawl the rod is flattened as at 27 and apertured to receive a pivot pin 28 which passes through apertures 29 in opposing walls 13 of the member C, to pivotally connect the rod to the member.

In order to permit movement of the pin 28, as the member C is rocked about its pivot 9, the extremity of the lever is notched at 30.

For maintaining the pawl 16 in latched engagement with the ratchet teeth 19 of the plate 17, a coil spring 31 is disposed about the rod, adjacent its connection to the yoke 25, and at one end bears against the yoke, as illustrated in Figure 2. To maintain the spring 31 under compression a clip or sleeve 32 is fashioned having a cylindrical part through which the rod 23 extends, and a hook 33 which engages over an abutment, or other part, formed in the shank portion of the lever adjacent the pawl end of the same. The relationship of the clip 32 to its abutment is such that when applied in the manner shown in Figure 2, the spring 31 is under compression. The compression of the spring 31 tends to normally maintain the pawl and ratchet in latched engagement and by reason of the compression of the spring maintains the clip 32 in hooked engagement with the lever, thus eliminating any need for positive securement of the clip to the lever.

In assembling the lever as illustrated, the yoke 25 is passed over the rod 23, the spring 31 is then applied to the rod, the clip 32 is then applied, and the yoke 25 pivotally connected to the pawl 16. The assembly just described is then inserted through the hollow lever, from the fulcrum end thereof, and pawl 16 is then pivoted to the lever by means of the tubular pivot or sleeve 15.

In order to normally maintain the palm portion of the actuating member C in spaced or outward position, with respect to the grip portion 2 of the lever, a spring is utilized. The spring shown for this purpose is fashioned from wire with one end looped as at 34 about the rod 23, intermediate loops 35 formed in the wire to surround the pivot 28 when the parts are assembled, and an elongated portion 36 arranged to bear against the web 12 of the member C between the member pivot 9 and the extremity of the palm portion of the member.

After the rod 23 has been assembled, within the lever A, the remote end of the lever is pivoted to the member C by passing the rivet 28 through the apertures in the walls 13 of the member C, through the aperture in the flattened end 27 of the rod and through the turns 35 of the spring, whereupon the free end of the rivet is headed thus connecting the actuating member C to the rod 23. The pivot 9 is then applied and headed to thus connect the parts in operative relationship.

The length of the stop 11 is such as to allow suitable rocking movement of the member C on its pivot to disengage the pawl 16 from latched engagement with the ratchet.

The free end of the stop 11 is rounded to conform substantially to the interior transverse contour of the member C at the point of contact with the stop.

The spring D, in addition to maintaining the actuating member C in normal or inoperative position, prevents rattle of the various parts of the free end of the lever as the spring is sufficiently tensioned for this purpose.

The limits of rocking movement of the member C may be observed from Figures 2 and 3.

In Figure 2 the actuating member C is in the position normally occupied when the pawl is in latched engagement with the ratchet, that is with the palm engaging portion spaced from the extremity of the stop 11. Figure 3 shows the actuating member C rocked to move the rod 23 to unlatch the pawl from the ratchet and permit movement of the lever with respect to the ratchet.

In order to connect the lever to the brake mechanism of a vehicle, a yoke or clevis 37 is pivoted at one end to the ends of the legs 3 and 4 by a pin 38 which passes through the tubular pivot 15. The other end of the yoke 37 is pivoted at 39 to a crank 40 which is secured to a rock shaft 41. The brakes are connected to shaft 41.

The extent of the walls 13 of the actuating member C, is, as before explained, sufficient to overlie the open end of the extremity of the lever for any position occupied by the member C between its limits of rock. The construction is such that at no time is the margin 10 of the lever, which defines the open end, exposed to contact by the operator's hand. Because of the provision of the bulge or flare 7, the fingers of the operator's hands are kept away from the lower margin of the walls of the actuating member C at its end 14, during manipulation of the member C, thereby preventing injury to the hand.

Arranging the parts as described and shown, the actuating member C hides the stop 11, as well as the slot formed in the grip portion of the lever occasioned by striking out the stop from the material of the lever.

As the lever is swung, the sector 17 likewise is swung but in counter-angular direction. Such swinging movement of the sector causes differential movement between the pawl and the ratchet teeth whereby fine adjustment of the lever is obtained.

As an example of the efficiency of the lever of the present invention an illustration is presented.

Using a fixed sector, to move the lever to the first tooth required 70 pound pull; the second tooth required 140 pound pull; the third tooth 208 pound pull, the fourth tooth 280 pound pull, and the fifth tooth 365 pounds.

With the floating sector, the first tooth reqires 14 pound pull; the second tooth 35 pounds; the third tooth 60 pounds; the fourth tooth 86 pounds, and the fifth tooth 110 pounds.

In the case of the fixed ratchet the pull required was approximately 70 to 75 pounds per tooth, while with the floating sector or ratchet, the pull was approximately 25 pounds per tooth.

From the above figures, it may be assumed that 70 pound pull on the brake lever is required to set the emergency brake tightly enough to prevent a car from rolling down hill when parked. As soon as wear occurs in the brake linings, the first tooth which originally represented 70 pounds could now represent, say, only 50 pounds, due to slack in the brake cable, and due to lining wear. Assuming that the 50 pound pull would be insufficient to hold the car, another notch of the ratchet would be necessary. This would mean, with a fixed ratchet, a pull of 120 pounds. No ordinary person operating a car, could be expected to exert such a pull to set the emergency brake.

With the floating sector, there are three ranges of pull less than 120 pounds, which could be used to set the brakes.

The invention has been herein described more or less precisely as to details, yet it is to be understood that the invention is not to be limited thereby as changes may be made in the arrangement and proportion of parts, and equivalents may be substituted, without departing from the spirit and scope of the invention.

The invention is claimed as follows:

1. In a hand brake lever construction, a support, a one piece lever pivoted between its ends to said support and having parallel legs at one end, a ratchet plate pivoted between said legs in vertically and longitudinally extending planes, said plate having an arcuate upper edge formed with ratchet teeth, a pawl pivoted to said lever in position to make latching engagement with said teeth, a pawl operating rod within said lever body, a yoke pivoted to said pawl with its legs astraddle the pawl, the web of said yoke being apertured to receive the adjacent end of said rod, and the said end of said rod being headed against said web to engage the yoke to move the yoke and pawl when the rod is moved in release direction.

2. In a device of the class described, in combination, a hollow brake lever pivoted at one end, a pawl pivoted to said lever, a rod reciprocable within said lever, a yoke astraddle and pivoted to said pawl and receiving an end of said rod, said rod end being headed to exert pull against the yoke, a spring surrounding said rod and at one end bearing against said yoke to normally urge said pawl in one direction, and a clip constituting a stop against the other end of said spring for holding said spring under compression against said yoke, said clip being hooked to said lever and maintained in hooked relationship solely by the compressive action of said spring.

3. In a brake lever construction of the class described, in combination, a plate bracket, a lever member pivoted to said plate adjacent one end and having a grip portion at the other end, a floating ratchet sector pivoted to said lever adjacent its pivoted end, a pawl pivoted to said lever in position to cooperate with said ratchet to latch the lever in adjusted position, a yoke pivotally connected to said pawl, a release rod connected to said yoke, an actuating member pivoted adjacent the grip end of said lever and connected to said rod for moving it in one direction to unlatch the pawl from the ratchet sector, a spring surrounding said rod and at one end bearing against said yoke to normally maintain said pawl latched with said ratchet, and a sleeve surrounding said rod and making hooking engagement with said lever member to compress said spring and cause it to urge the pawl in latching direction.

4. In a brake lever construction of the class described, in combination, a brake lever pivoted to swing, a pawl pivoted to said lever to latch with a ratchet, a pawl release rod extending along said lever, a manipulating member at the grip end of said lever pivoted to said rod, the end of said rod adjacent said pawl being headed, a yoke having an apertured web about the head end of said rod and with its legs astraddle said pawl and thereto pivoted, a spring surrounding said rod and at one end bearing against the yoke web, a sleeve surrounding said rod and engaging the other end of the spring, said sleeve having a lateral projection for hooking engagement with the lever member to tension said spring to thereby maintain the pawl in latched engagement with a ratchet.

RAY A. SANDBERG.